United States Patent [19]

Havens, deceased et al.

[11] Patent Number: 4,627,573
[45] Date of Patent: Dec. 9, 1986

[54] PRESSURE COMPENSATOR/EMITTER

[75] Inventors: Glenn G. Havens, deceased, late of La Mesa, by Florine P. Havens, executrix; by Richard C. Thompson, executor, San Diego, all of Calif.

[73] Assignee: Havens International, San Diego, Calif.

[21] Appl. No.: 581,286

[22] Filed: Feb. 17, 1984

Related U.S. Application Data

[63] Continuation-in-part of Ser. No. 251,180, Apr. 4, 1981, abandoned.

[51] Int. Cl.$^4$ ................................................ B05B 1/30
[52] U.S. Cl. ........................................ 239/542; 239/547; 239/599
[58] Field of Search ............... 239/533.13, 542, 547, 239/570, 597, 598, 599, 601, 145

[56] References Cited

U.S. PATENT DOCUMENTS

| 3,186,644 | 6/1965 | Ross et al. ............... 239/533.13 |
| 3,693,888 | 9/1972 | Rondas et al. ............... 239/542 |
| 3,797,741 | 3/1974 | Spencer ............... 239/542 X |
| 3,863,845 | 2/1975 | Bumpstead ............... 239/542 |
| 4,095,750 | 6/1978 | Gilead ............... 239/547 X |
| 4,139,159 | 2/1979 | Inoue et al. ............... 239/547 |
| 4,190,206 | 2/1980 | Atkinson et al. ............... 239/542 |

FOREIGN PATENT DOCUMENTS 2013821 8/1979 United Kingdom ............... 239/547

Primary Examiner—Joseph F. Peters, Jr.
Assistant Examiner—Mary Beth O. Jones
Attorney, Agent, or Firm—Brown, Martin, Haller & Meador

[57] ABSTRACT

A pressure compensating flow control device includes a generally elongated, collapsible tubular body of flexible material such as silicone rubber having a teardrop shaped inlet orifice for extending into a high pressure supply line, an outlet end for distributing a flow of liquid with the inlet orifice and tubular body collapsible in response to pressure to maintain a generally predetermined uniform flow rate over a predetermined pressure range. The inlet end of the tubular member tapers down to a reduced teardrop inlet orifice with the outlet opening in one embodiment comprising a crescent shaped slit in the wall of the tube.

4 Claims, 12 Drawing Figures

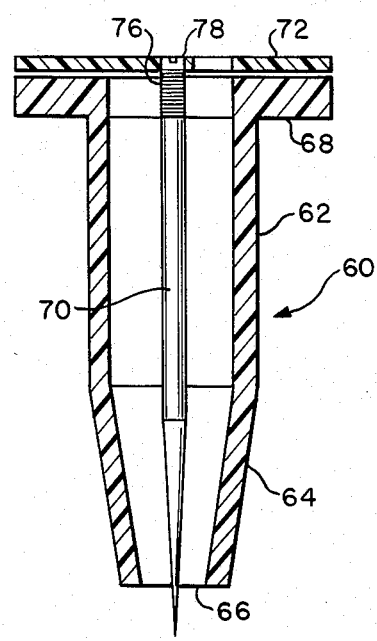
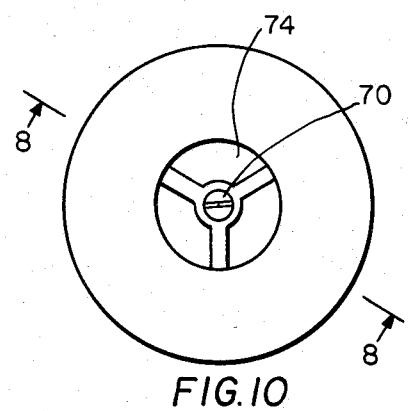
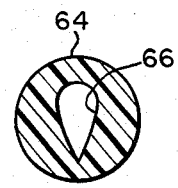
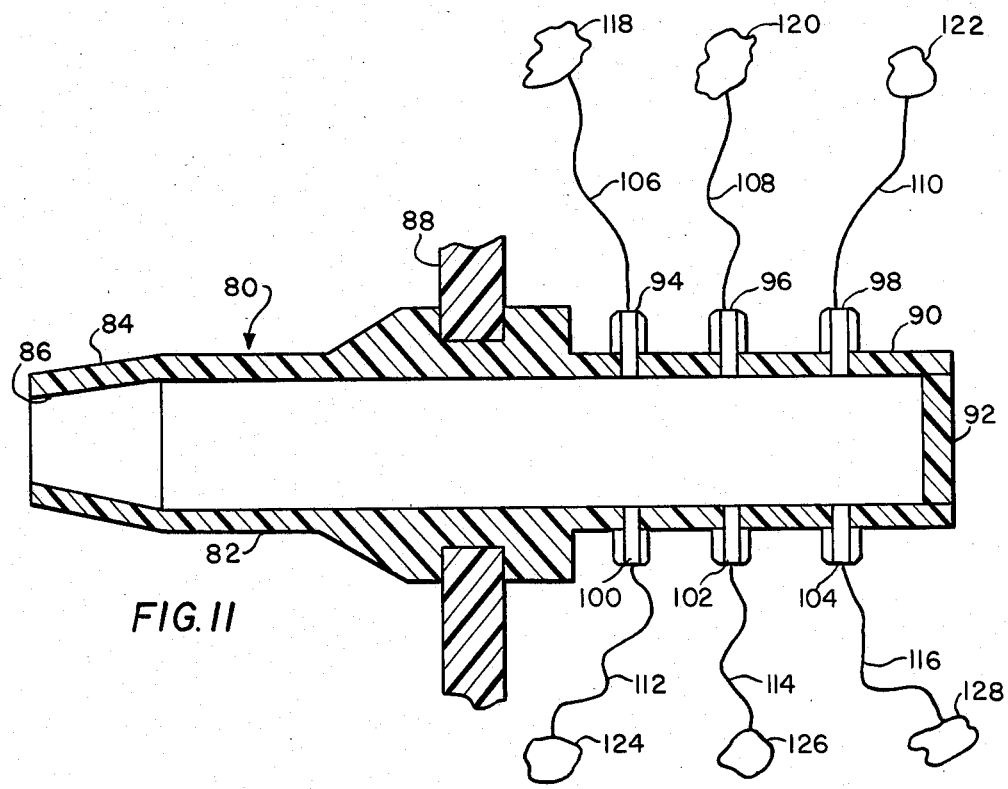

PRESSURE COMPENSATOR/EMITTER

REFERENCE TO RELATED APPLICATIONS

The present application is a continuation-in-part of application Ser. No. 251,180, filed Apr. 4, 1981, entitled Pressure Compensator/Emitter now abandoned.

BACKGROUND OF THE INVENTION

The present invention relates to fluid pressure compensation, and pertains particularly to improved devices for regulating flow rate uniformly over a relatively large range of pressures.

Pressure regulation is a particular problem for irrigation systems because of the pressure differentials that can occur in a supply line from the source of water to the end of the line. It is important to be able to uniformly distribute water over the length of the system throughout the many branches thereof regardless of the distance from the supply source. Pressure can drop a considerable amount from the supply source to the end of the line or along a branch as a result of the length of the line and various resistances in the line as well as elevations along which the line may be placed.

Other problems associated with drip irrigation systems and with low flow systems is the problem of clogging resulting in eliminating supply of water to certain locations. This is a particular problem for drip irrigation systems in regions wherein the water supply contains a high concentration of minerals and the like.

It has been found that up to forty percent of the emitters in the conventional drip irrigations systems become quickly clogged and non-functional in areas where the water has a high mineral content. This can severely hamper the functioning of the system and can result in loss or damage to crops.

It is desirable that an improved pressure regulating system be available.

SUMMARY AND OBJECTS OF THE INVENTION

It is therefore the primary object of the present invention to provide an improved pressure compensator.

In accordance with the primary aspect of the present invention a pressure compensator includes a tubular member having a reduced inlet end and sufficient flexibility to maintain a fairly uniform flow rate over a large predetermined pressure range.

BRIEF DESCRIPTION OF THE DRAWINGS

The above and other objects and advantages of the invention will become apparent from the following description when read in conjunction with the drawings wherein:

FIG. 8 is a sectional view along line 8—8 of FIG. 10.

FIG. 9 is an end view of the embodiment of FIG. 8;

FIG. 10 is an end view of still another embodiment.

FIG. 11 is a schematic view of a system with a portion enlarged and in section to show details.

DETAILED DESCRIPTION OF PREFERRED EMBODIMENTS

Figure 1:
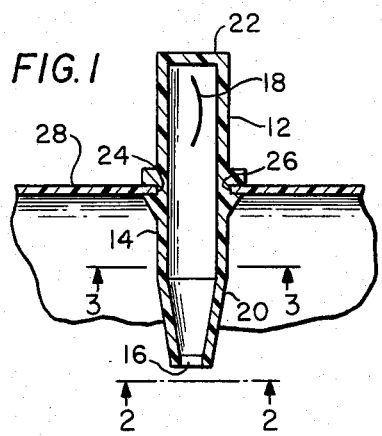
FIG. 1 is a side elevational view of a preferred embodiment of the emitter show in section, mounted in the wall of a supply line.
Figure 2:
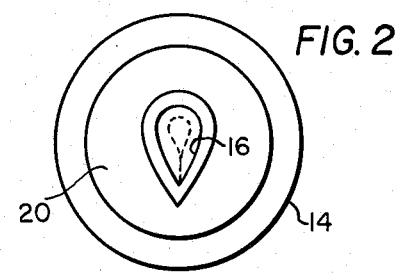
FIG. 2 is an enlarged view taken on line 2—2 of the embodiment of FIG. 1.

Turning to FIG. 1 of the drawings there is illustrated a preferred embodiment of a pressure compensated emitter in accordance with the invention incorporated in the flow control device designated generally by the numeral 10. The illustrated emitter comprises a generally elongated tubular body member 12 having a central generally cylindrical barrel section 14 with a central bore communicating with an inlet port or orifice 16 at the inlet end of the body member and an outlet opening 18 at the outlet end. The emitter at the inlet or forward end includes a tapered portion 20 tapering down to the inlet opening 16 which has a teardrop configuration (FIG. 2). At the outlet end the opening may be any suitable position or configuration but for emitters is preferably located in the side wall as illustrated at 18 and in the form of a crescent slot. The slot has several advantages as will be more fully discussed, but its primary advantage is the reduction in prospects by plugging by sediment and minerals in the water that precipitate out. The slotted outlet opening opens in response to pressure in the emitter and closes when the pressure drops or the water supply is eliminated such that moisture is maintained in the emitter that prevents the precipitation of minerals that tend to cake and form on the opening or walls surrounding the opening and close the opening. The body member preferably is plugged at the outer or outlet end 22.

The body member 12 is preferably made of a very resilient material such as silicone rubber and may be formed in the shape as illustrated to include an annular groove or the like 24 for inserting in an opening or bore 26 in the walls of a supply line or tube 28. Alternatively, it may be mounted in a hard plastic housing as will be subsequently explained. The orifice or inlet end 16 extends into and communicates with the high pressure fluid or water in the interior of the supply line with the outlet end extending to the lower pressure distribution area to which the water or other liquid is supplied. The emitter can also be installed in a body member such as formed of a hard material such as a hardened plastic as will be discussed.

Figure 3:
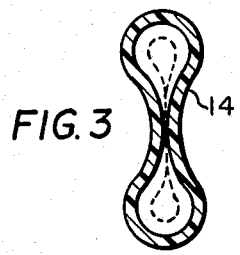
FIG. 3 is an enlarged section view taken along lines 3—3 of FIG. 1.

In the illustrated example (FIG. 2) the orifice opening 16 is designed in a teardrop shape to maintain a substantially constant flow from about zero up to a certain predetermined pressure level, usually about 5 to 8 psi, at which time the walls of the barrel 14 inside the supply line begin to collapse as seen in FIG. 3 into a generally figure-eight or teardrop configuration and function to control the flow rate in response to the pressure. It is important to appreciate that the velocity of flow through orifice 16 and within the bore of the barrel reduces the pressure therein (creates a differential pressure between the outside and inside thereof) such that the walls will collapse, thus restricting and reducing the flow therethrough so as to maintain or establish an equilibrium pressure between the fluid inside the bore and the fluid acting on the outer walls for establishing a substantially constant flow rate. It is anticipated that the primary configuration will be substantially as that illustrated in FIG. 1 with the nose portion 20 being generally conical in configuration tapering down to the teardrop inlet orifice opening 16. A teardrop inlet opening or orifice as shown in FIGS. 2 and 5 provides a structure that has been found to have advantageous properties.

Turning to FIG. 3 of the drawing the emitter of FIG. 1 is illustrated in operation with the pressure within the walls of the barrel section 14 of the tubular member causing the walls to collapse into the figure-eight for restricting the flow of fluid along the bore of the emitter member. The opening outlet at 18 has opened to permit the flow of fluid therefrom. The construction of the device in its preferred form is such in configuration and flexibility as to maintain a substantially constant fluid flow over a relatively large pressure range. This results from the pressure drop through inlet orifice or port 16 causing the walls around the orifice to collapse and restrict the flow rate. As pressure increases, the walls of the barrel 14 collapse into the figure-eight or double teardrop configuration and take over for higher pressure ranges.

Tests have indicated that capability of maintaining a fluid flow of one gallon per hour, for example, over a range of from less than ½ psi to as much as 40 psi. Tests have shown the capability of the emitter of maintaining a substantially constant flow with a mean deviation of only 2.3% over a pressure range of from 1 psi to 40 psi. It is important to understand that the present development was developed primarily for drip irrigation distribution of water and was directed to the problems associated therewith. However, the structure and principles can be adapted and applied to other liquids and other applications such as the control of a fluid from a main supply line to one or more branch supply lines, or other forms of outlets for example.

Figure 4:
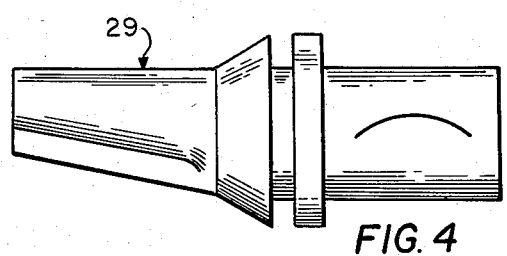
FIG. 4 is a side elevational view of an alternate embodiment.
Figure 5:
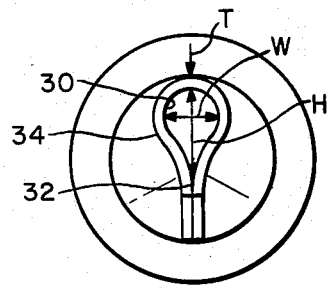
FIG. 5 is an end view of the embodiment of FIG. 4.

The emitter 29 of FIGS. 4 and 5 is an elongated tubular member substantially as in the previous embodiment, however, having a generally teardrop shaped opening 30 and barrel up to the wall of the supply line. This opening can be formed by bonding of the walls together at 32 on one side of the tube extending down to a smaller opening 30 than the main bore of the body member. This configuration provides a slightly more limited range of compensation. The teardrop inlet orifice with uniform wall thickness produces a flow condition as represented by the curve A in FIG. 7, but with limits as to the upper end of the range of pressure.

The flow controller construction in the FIGS. 1-3 embodiment is such that the orifice section 16 defines or establishes the primary flow rate and is shaped with the teardrop configuration to provide immediate control of the flow rate in response to minor pressure, such as for example between 0 and 1 psi and in most instances is calibrated or constructed to control pressure up to about 10 psi. The teardrop configuration is essentially a precollapsed wall construction wherein the inner surface of walls converge together at the v-portion substantially to a common plane. The walls are also of a uniform thickness around the orifice. This configuration responds immediately to a differential pressure between the interior and exterior to immediately restrict (or constrict) the orifice in direct relation to pressure differential (the cross sectional area of the orifice is inversely proportional to pressure) and establishes a uniform flow rate as shown by curve A in FIG. 7 regardless of pressure (within limits). The cross-section of the channel becomes a linear function of external pressure. The teardrop shape (because of its immediate direct response) is specific to the efficient control of uniform fluid flow with varying pressure ranges.

The teardrop shape is defined by a family of curves known as sine generated curves of the family:

a=K sine (s), where s is the distance around the orifice in radians, a is the angle to the tangent of the curve, and K is a constant for the particular orifice varying from 100 to 120.

The barrel tubular section 14 takes over at a pressure just below the upper limits of control by the orifice and begins controlling at about 9 psi (for example) up to an upper limit which may be on the order of about 40 or 50 psi. The barrel section 14 which also has a uniform wall thickness collapses into a substantially figure-eight configuration (FIG. 3) at about 9 psi during its control mode thereby forming a double teardrop configuration. Thus, the collapsed barrel section responds after collapse like the teardrop.

The inlet orifice section of the compensator can be selected to provide any number of rates of flow. The pressure compensated flow controller can be manufactured to have any number of orifice sizes for any selected flow desired. The pressure compensator body can be color coded for the various flow rates, such as for example, red for a 0.5 gph, green for 1.0 gph and blue for 1.5 gph.

Figure 7:
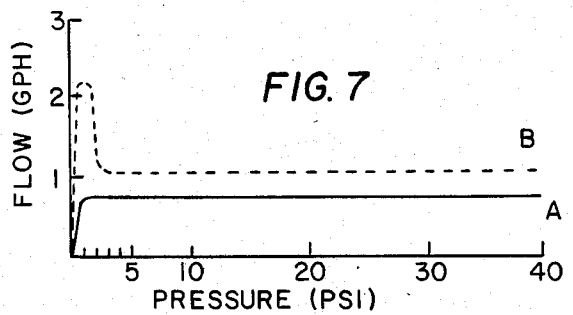
FIG. 7 is a graph showing pressure versus flow rate for embodiments of the invention.

The compensator unit has specific dimensions calibrated or calculated to provide the desired flow rate and can provide a flow rate as shown by the A curve in FIG. 7 of a substantially flat or uniform flow rate over an extended period from just slightly above 0 along a line of maximum flow rate that is maintained substantially constant out to approximately 40 or 50 psi. In other words, the compensator allows the flow rate to reach maximum very quickly and maintains that rate, not going above or below that rate over the extended control range. The relationships of the cross-sectional dimension and of the flow control body is governed by the relationship between the wall thickness of the body, the internal diameter and the length of the barrel of the section.

The specific shape (i.e. teardrop) is selected to yield the required flow at the lowest pressure based on area, pressure, viscosity of the fluid, and orifice coefficient. The area can be determined experimentally.

The wall thickness and modulus of elasticity of the orifice material is selected such that a constant is maintained as a function of pressure as the orifice reduces under increasing pressures.

The teardrop configuration, when formed from an elastomer, is the only shape that can satisfy all of the above conditions.

Flow rates up to approximately 5 or 10 gals and 15-18 psi can be economically handled by the teardrop orifice. The precision of fabrication of the orifice increases as a function of pressure. If an elastomeric tube is connected immediately downstream from the orifice, and designed such that it will buckle at between 3 and 12 psi forming a figure-eight cross section, the required precision of the orifice can be reduced and still maintain precise compensation even at extended pressures.

The function of the buckling tube is to maintain a constant pressure drop across the orifice. The conditions of the tubular section will fit the general family of curves:

$$P_c = \frac{2.42\,E}{(1-\mu^2)^{\frac{3}{4}}} \times \frac{(t/D)^{5/2}}{\left[\frac{L}{D} - 0.45\,(t/D)^{\frac{1}{2}}\right]^2} \quad \text{Equation 1}$$

where
 $P_c$ = collapse pressure, psi
 E = modulus of elasticity
 $\mu$ = Poisson's ratio for the material
 t = thickness
 D = neutral diameter of the tube
 L = length of the tube The teardrop configuration has been found with a proper establishment of slenderness ratio and in combination with a downstream collapsible barrel to provide a cyclic device wherein the walls oscillate and/or cycles and creates a humming sound. The walls of the orifice and barrel alternately collapse and open at a fairly high frequency. This phenomenon which can also be termed flutter, has been found to depend on a particular slenderness ratio, that is, the ratio between the dimensions width W and height H of the inlet opening. By way of example, an emitter may have a total length of about 0.625 inches, with a wall thickness of about 0.017 inches, a nose taper extending for a length of about 0.129 inches, an inlet opening having dimensions of height H equal to approximately 0.058 with width W equal to approximately 0.028, and the outer diameter being approximately 0.112. This is the general dimension of emitters that have been formed and tested. These emitters have also been found to be effective to prevent plugging with certain types of sand that present a problem for other emitters. The flutter or humming is found to occur at certain pressure ranges for certain emitters (about 15 to 25 psi for some tested).

Figure 6A:
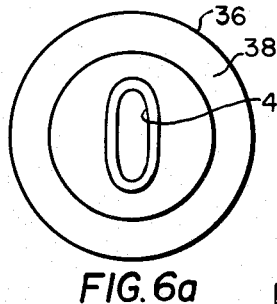
FIG. 6a is an end view of the embodiment of FIG. 6.
Figure 6:
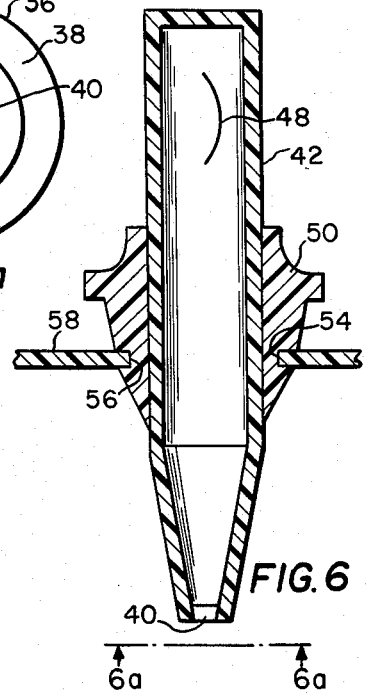
FIG. 6 is a side elevation view of a further embodiment.

Turning now to FIG. 6A an alternate configuration for the inlet opening is illustrated wherein an emitter 36 has a nose portion 38 tapering down to a long or flat oval shape inlet opening 40. This configuration is constructed to the function to produce a condition somewhat like that represented by line B of FIG. 7. The oval configuration will provide a predetermined constant flow rate after creasing of the wall on collapsing into a figure-eight or double teardrop configuration. The orifice can be designed to require a certain minimum pressure to collapse into the figure-eight or double teardrop configuration, at which pressure constant flow regulation begins. Alternatively the inlet port can be constructed to be initially collapsed into the figure-eight or double teardrop configuration (not shown) so that regulation begins immediately as indicated by curve A of FIG. 7.

Turning now to FIGS. 8–10 still another embodiment of the invention illustrates a modification for providing an adjustable flow rate. In this embodiment a flow control device designated generally by the numeral 60 includes a generally cylindrical, tubular body 62 having a forward or lower conical or tapered nose portion 64 with an inlet 66 communicating with the through bore. The inlet portion as best seen in FIG. 9 is of a generally teardrop configuration with the outer surface of the nose and body portion of the flow control device having generally circular or cylindrical configuration. This modification, as will be appreciated, can provide some variation of the response of the previous embodiment particularly like curve B of FIG. 7. The cylindrical barrel section of the device has a uniform wall thickness and collapses into the figure-eight or double teardrop configuration for flow regulation. The body portion of the device includes a flange 68 or other means for attaching or anchoring the body portion.

Flow adjusting means in the form of an elongated centrally or coaxially extending needle member 70 is adjustably anchored in a mounting plate or the like which secures to the flange 68. A suitable opening 74 is provided in the plate 72 for permitting communication with a certain suitable outlet device or the like (not shown). The needle 70 includes an elongated threaded portion or shank 76 threadably engaging a bore 78 in the plate 72. With this arrangement, the needle 70 can be inserted in the bore of the flow control device and adjusted along the bore to cooperatively extend to or beyond the inlet opening 66 for varying the effective opening and passageway therethrough and cooperating therewith for adjusting the flow rate over the responsive pressure rate of the system. This adjusting feature of course can be utilized with any of the previously illustrated configurations and any form of outlet can be utilized therewith.

Turning now to FIG. 11 a further modification and utilization of a flow control device in a system is illustrated. In this illustrated embodiment, advantage is taken of the ability to modify the flow control device to various sizes and retain the flow control capabilities to control multiple outlets. *Impèrical* results show that flow control device of this invention with diameters ranging from one-half inch to twelve inches perform in substantially the same manner as micro-sized devices.

The advantage of such devices is that they can be utilized for large volume flow lines and effectively control the flow rate therein over a predetermined pressure range. Multi-stage flow control can be achieved over a number of supply and branch lines.

In addition to the above discussed assets, a flow control device can be utilized for a multiple number of feeder lines as illustrated in FIG. 11. The flow control device designated generally by the numeral 80 includes a body constructed of materials as previously described and including main body portion 82 with a nose portion 84 and reduced inlets 86 as in any of the previous embodiments. The device includes suitable mounting means for mounting in a bore in a wall 88 of a supply line. The outlet end of the flow control device, as illustrated, includes a plurality of outlets communicating with an outer body portion 90, said outer body being constructed so as to define a common chamber 92. Communicating with this common chamber 92 is a plurality of outlet ports 94, 98, 100, 102, and 104. Each outlet port supplies a supply line 106, 108, 110, 112, 114, and 116 respectively. These each separately supply fluid to a plant, as illustrated by 118, 120, 122, 124, 126, 128, respectively. It should be appreciated, however, that all of the supply lines, 106 through 116 are preferably of substantially the same length and elevation. With this arrangement the same amount of fluid will be supplied to each of the stations 118 through 128. The advantage of this construction is that the larger flow control devices are less susceptible to plugging than the micro size devices and thus in certain installations, the larger devices can be more effectively utilized.

While I have illustrated and described my invention by way of specific embodiments, it is to be understood that numerous changes and modifications may be made therein without departing from the spirit and scope of the invention as defined in the appended claims. For example, the device can be used to function primarily as a flow control device between primary and secondary flow lines or within a main supply line to an appliance.

Having illustrated and described my invention, I now claim:

1. A pressure compensating flow control device for compensating for irregular pressure for maintaining a predetermined generally uniform flow rate over a predetermined pressure range comprising:

a flexible tubular member having collapsible walls of a substantially uniform thickness defining a central bore, an inlet end having an inlet orifice for communicating with a fluid source, and an outlet end having an outlet port; said inlet orifice and outlet port communicating with said central bore, said inlet orifice having a teardrop cross sectional configuration and said central bore collapsing such that as fluid source pressure varies from zero to a first pressure the flow rate increases from zero to a maximum flow rate and as fluid source pressure varies from said first pressure to a second higher pressure said maximum flow rate is substantially maintained.

2. The pressure compensator of claim 1 wherein said tubular member is constructed of silicone rubber.

3. The pressure compensator of claim 1 wherein the outlet opening is a slit in the wall of said tubular member.

4. The pressure compensator of claim 3 wherein said slit is crescent-shaped.

* * * * *